United States Patent
Adams et al.

(10) Patent No.: US 7,433,819 B2
(45) Date of Patent: Oct. 7, 2008

(54) ASSESSING FLUENCY BASED ON ELAPSED TIME

(75) Inventors: Marilyn Jager Adams, Belmont, MA (US); Valerie L. Beattie, Macungie, PA (US)

(73) Assignee: Scientific Learning Corporation, Oakland, CA (US)

( * ) Notice: Subject to any disclaimer, the term of this patent is extended or adjusted under 35 U.S.C. 154(b) by 775 days.

(21) Appl. No.: 10/938,748

(22) Filed: Sep. 10, 2004

(65) Prior Publication Data

US 2006/0074659 A1    Apr. 6, 2006

(51) Int. Cl.
    *G10L 15/00*    (2006.01)
(52) U.S. Cl. .................. 704/251; 704/253; 704/270; 434/308; 434/354; 434/362
(58) Field of Classification Search .......... 704/251, 704/253, 270; 434/308, 354, 362
    See application file for complete search history.

(56) References Cited

U.S. PATENT DOCUMENTS

| | | | |
|---|---|---|---|
| 5,870,709 A | 2/1999 | Bernstein | |
| 5,875,428 A | 2/1999 | Kurzweil et al. | |
| 5,920,838 A * | 7/1999 | Mostow et al. ............. | 704/255 |
| 5,999,903 A | 12/1999 | Dionne et al. | |
| 6,014,464 A | 1/2000 | Kurzweil et al. | |
| 6,017,219 A | 1/2000 | Adams, Jr. et al. | |
| 6,033,224 A | 3/2000 | Kurzweil et al. | |
| 6,052,663 A | 4/2000 | Kurzweil et al. | |
| 6,068,487 A | 5/2000 | Dionne | |
| 6,120,297 A | 9/2000 | Morse, III et al. .......... | 434/169 |
| 6,137,906 A | 10/2000 | Dionne | |
| 6,157,913 A | 12/2000 | Bernstein | |
| 6,188,779 B1 | 2/2001 | Baum | |
| 6,199,042 B1 | 3/2001 | Kurzweil | |
| 6,246,791 B1 | 6/2001 | Kurzweil et al. | |
| 6,256,610 B1 | 7/2001 | Baum | |
| 6,320,982 B1 | 11/2001 | Kurzweil et al. | |
| 6,435,876 B1 | 8/2002 | Chen | |
| 6,511,324 B1 * | 1/2003 | Wasowicz ................... | 434/167 |
| 6,556,970 B1 * | 4/2003 | Sasaki et al. ................ | 704/257 |
| 6,634,887 B1 | 10/2003 | Heffernan, III et al. | |
| 6,676,413 B1 * | 1/2004 | Best et al. ................... | 434/178 |
| 6,986,663 B2 * | 1/2006 | Budra et al. ................ | 434/169 |
| 7,062,220 B2 * | 6/2006 | Haynes et al. .............. | 434/353 |
| 2002/0086268 A1 | 7/2002 | Shpiro ........................ | 434/156 |
| 2003/0093275 A1 * | 5/2003 | Polanyi et al. ............. | 704/251 |

(Continued)

OTHER PUBLICATIONS

Mostow et al. "When speech input is not an afterthought: A reading tutor that listens".*

(Continued)

*Primary Examiner*—Daniel D Abebe
(74) *Attorney, Agent, or Firm*—Fish & Richardson P.C.

(57) ABSTRACT

A computer based method and related system, computer program product and device includes receiving audio input associated with a user reading a sequence of words and determining an approximate amount of time corresponding to an absence of input associated with an assessed word, after receiving audio input associated with a preceding word in the sequence of words, or since the start of the audio buffer or file. The method can also include displaying a visual indication or generating an audio intervention based on the determined amount of time corresponding to an absence of input.

31 Claims, 15 Drawing Sheets

U.S. PATENT DOCUMENTS

2003/0156632 A1* 8/2003 Dowling .................... 375/222
2004/0049391 A1* 3/2004 Polanyi et al. ............. 704/271
2004/0234938 A1 11/2004 Woolf et al.

OTHER PUBLICATIONS

Cucchiarini et al. "quantitative assessment of second language learners' fluency by means of automatic speech recognition technology" ☐☐ACSA Feb. 2000.*

Fairweather et al., "Overcoming Technical Barriers to a Speech-enabled Children's Reading Tutor," retrieved from http://www.research.ibm.com/AppliedLearningSciWeb/Fairweather/techbar.pdf, IBM T.J. Watson Research Center, Yorktown heights, NY, 12 pages.

Banerjee et al., "Evaluating the Effect of Predicting Oral Reading Miscues" Project Listen; retrieved from http://www-2.cs.cmu.edu/~listen/pdfs/Eurospeech2003_Evaluating_predicted_mis, 4 pages.

Mostow et al. "A Prototype Reading Coach that Listens"; retrieved from http://www-2.cs.cmu.edu/%7Elisten/pdfs/aaai94_online.pdf, 9 pages.

Notification of Transmittal of The International Search Report and The Written Opinion of the International Searching Authority, or the Declaration, Jul. 28, 2008, 15 pages.

* cited by examiner

FIG. 3

| a | an | am | and | are | as | at |
|---|---|---|---|---|---|---|
| be | by | but | can | did | do | for |
| from | get | go | had | has | have | he |
| her | him | his | I | in | into | is |
| it | its | it's | may | me | my | no |
| not | of | on | or | our | out | she |
| so | that | their | them | the | then | they |
| this | to | too | the | up | us | was |
| we | were | what | who | with | when | whose |
| yes | you | your | | | | |

FIG. 11

ASSESSING FLUENCY BASED ON ELAPSED TIME

BACKGROUND

Reading software tends to focus on reading skills other than reading fluency. A few reading software products claim to provide benefit for developing reading fluency. One component in developing reading fluency is developing rapid and correct recognition and pronunciation of words included in a passage.

SUMMARY

According to an aspect of the present invention, a computer based method includes receiving audio input associated with a user reading a sequence of words. An automatic speech recognition process can be used to determine if, and at what point in the audio input, the user spoke each word. The sequence of words can be displayed on a graphical user interface, and includes one or more words for which the fluency assessment based on elapsed time is made. For each assessed word there may be a preceding word (the word immediately prior to the assessed word in the text) which is used in the elapsed time measurement. The method also includes determining an approximate amount of time corresponding to an absence of input associated with an assessed word, after receiving audio input identified as the preceding word in the sequence of words. If an assessed word is the first word in the sequence of words corresponding to a particular audio buffer or file, the method also includes determining an approximate amount of time corresponding to an absence of input identified as the assessed word, measured from the start of the audio buffer or file. The method also includes generating a visual intervention by displaying a visual indication on the graphical user interface, if the amount of time is greater than a first threshold. Subsequent to generating a visual intervention, the method includes generating an audio intervention if the amount of time since the visual indication is greater than a second threshold, and audio input that is identified as with the assessed word has still not been received.

Embodiments can include one or more of the following. The visual intervention can include a visual indicium applied to the assessed word. The visual indicium can include a visual indicium selected from the group consisting of highlighting the assessed word, underlining the assessed word, or coloring the text of the second word.

The method can also include determining an approximate amount of time between receiving audio input that is identified as with the preceding word in the sequence of words and the assessed word in the sequence of words and presenting a visual indicium if the amount of time between receiving audio input that is identified as the preceding word in the sequence of words and the assessed word is greater than a third threshold. The visual indicium can be a deferred visual indicium which is presented after the user has finished the text or indicated to the tutoring software that s/he have stopped reading. The deferred visual indicium can be presented by placing the second word on a review list. The deferred visual indicium can be presented by coloring the text of the assessed word. Generating an audio intervention can include generating an audio intervention selected from the group consisting of an audio file that includes a pronunciation of the assessed word and an audio file that includes an indication for the user to re-read starting with the assessed word. The method can also include generating a first report including words for which a visual intervention or deferred visual indication was displayed and/or generating a second report including words for which an audio intervention was generated. The first threshold can be between about 1 and 3 seconds. The second threshold can be between about 1 and 8 seconds. The third threshold can be between about 0.5 and 5 seconds. Determining an approximate amount of time between receiving audio input that is identified as a preceding word, and receiving audio input that is identified as an assessed word, can include measuring an amount of time from the end of the preceding word to the beginning of the assessed word. Determining an approximate amount of time between receiving audio input identified as a preceding word, and receiving audio input identified as an assessed word, can alternatively include measuring an amount of time from the end of the preceding word to the end of the assessed word.

The method can also include adjusting the timing thresholds based on a timing gap between the end of the assessed word and the beginning of the word following the assessed word. The method can also include adjusting the timing thresholds based on the position of the word in the sentence and/or audio file. The method can also include adjusting the timing thresholds based on the proximity of the word to punctuation or a phrase boundary. The timing thresholds can be different for different word categories and for different users of the software.

In another aspect, the invention includes a computer program product residing on a computer-readable medium. The computer program product includes instructions for causing an electrical device to receive audio input associated with a user reading a sequence of words. The sequence of words can be displayed on a graphical user interface and can include an assessed word and optionally a word preceding the assessed word. The computer program product can include instructions to determine an approximate amount of time corresponding to an absence of input associated with the assessed word, since receiving audio input identified as the preceding word in the sequence of words, or since the start of the audio file or buffer associated with the sequence of words if there is no preceding word. The computer program product can also include instructions to display a visual intervention on the graphical user interface if the amount of time is greater than a first threshold and subsequent to displaying a visual intervention, generate an audio intervention if the amount of time since the visual indication is greater than a second threshold, and audio input associated with the assessed word has still not been received.

Embodiments can include one or more of the following. The visual indicium can include a visual indicium selected from the group consisting of highlighting the assessed word, underlining the assessed word, or coloring the text of the assessed word. The computer program product of can also include instructions to determine an approximate amount of time between the audio segment identified as the preceding word in the sequence of words and the audio segment identified as the assessed word in the sequence of words and present an indicium if the amount of time between the audio segment identified as the preceding word in the sequence of words and the audio segment identified as the assessed word is greater than a third threshold. The computer program product of can also include instructions to generate a first report including words for which a visual intervention or deferred visual indicium was displayed. The computer program product of can also include instructions to generate a second report including words for which an audio intervention was generated.

In another aspect, the invention includes a device configured to receive audio input associated with a user reading a sequence of words, the sequence of words displayed on a graphical user interface, and including an assessed word and optionally a word preceding the assessed word. The device is also configured to determine an approximate amount of time corresponding to an absence of input associated with the assessed word, since receiving audio input identified as the preceding word in the sequence of words, or since the start of the audio file or buffer associated with the sequence of words if there is no preceding word. The device is also configured to display a visual intervention on the graphical user interface if the amount of time is greater than a first threshold. The device is also configured to subsequent to displaying a visual intervention, generate an audio intervention if the amount of time since the visual indication is greater than a second threshold, and audio input associated with the assessed word has still not been received.

The visual indicium includes a visual indicium selected from the group consisting of highlighting the assessed word, underlining the assessed word, or coloring the text of the assessed word. The device can also be configured to determine an approximate amount of time between the audio segment identified as the preceding word in the sequence of words and the audio segment identified as the assessed word in the sequence of words and present an indicium if the amount of time between the audio segment identified as the preceding word in the sequence of words and the audio segment identified as the assessed word is greater than a third threshold. The device can also be configured to generate a first report including words for which a visual intervention or deferred visual indicium was displayed. The device can also be configured to generate a second report including words for which an audio intervention was generated.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 3 is a screenshot of a passage for use with the reading tutor software.

FIG. 11 is a table of exemplary glue words.

DETAILED DESCRIPTION

Figure 1:
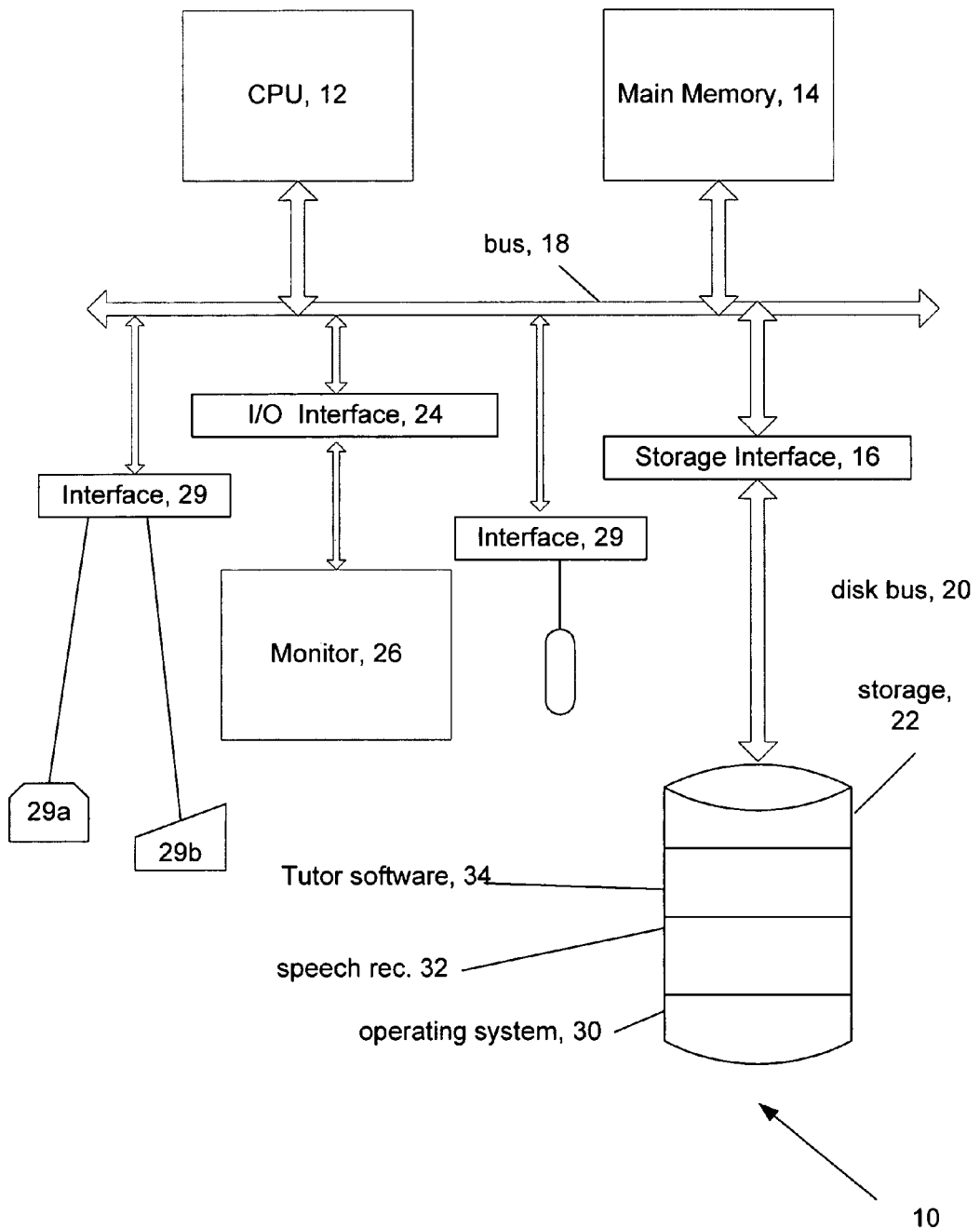
FIG. 1 is a block diagram of a computer system adapted for reading tutoring.

Referring to FIG. 1, a computer system 10 includes a processor 12, main memory 14, and storage interface 16 all coupled via a system bus 18. The interface 16 interfaces system bus 18 with a disk or storage bus 20 and couples a disk or storage media 22 to the computer system 10. The computer system 10 would also include an optical disc drive or the like coupled to the bus via another interface (not shown). Similarly, an interface 24 couples a monitor or display device 26 to the system 10. Other arrangements of system 10, of course, could be used and generally, system 10 represents the configuration of any typical personal computer. Disk 22 has stored thereon software for execution by a processor 12 using memory 14. Additionally, an interface 29 couples user devices such as a mouse 29a and a microphone/headset 29b, and can include a keyboard (not shown) to the bus 18.

The software includes an operating system 30 that can be any operating system, speech recognition software 32 which can be an open source recognition engine or any engine that provides sufficient access to recognizer functionality, and tutoring software 34 which will be discussed below. A user would interact with the computer system principally though mouse 29a and microphone/headset 29b.

Figure 2:
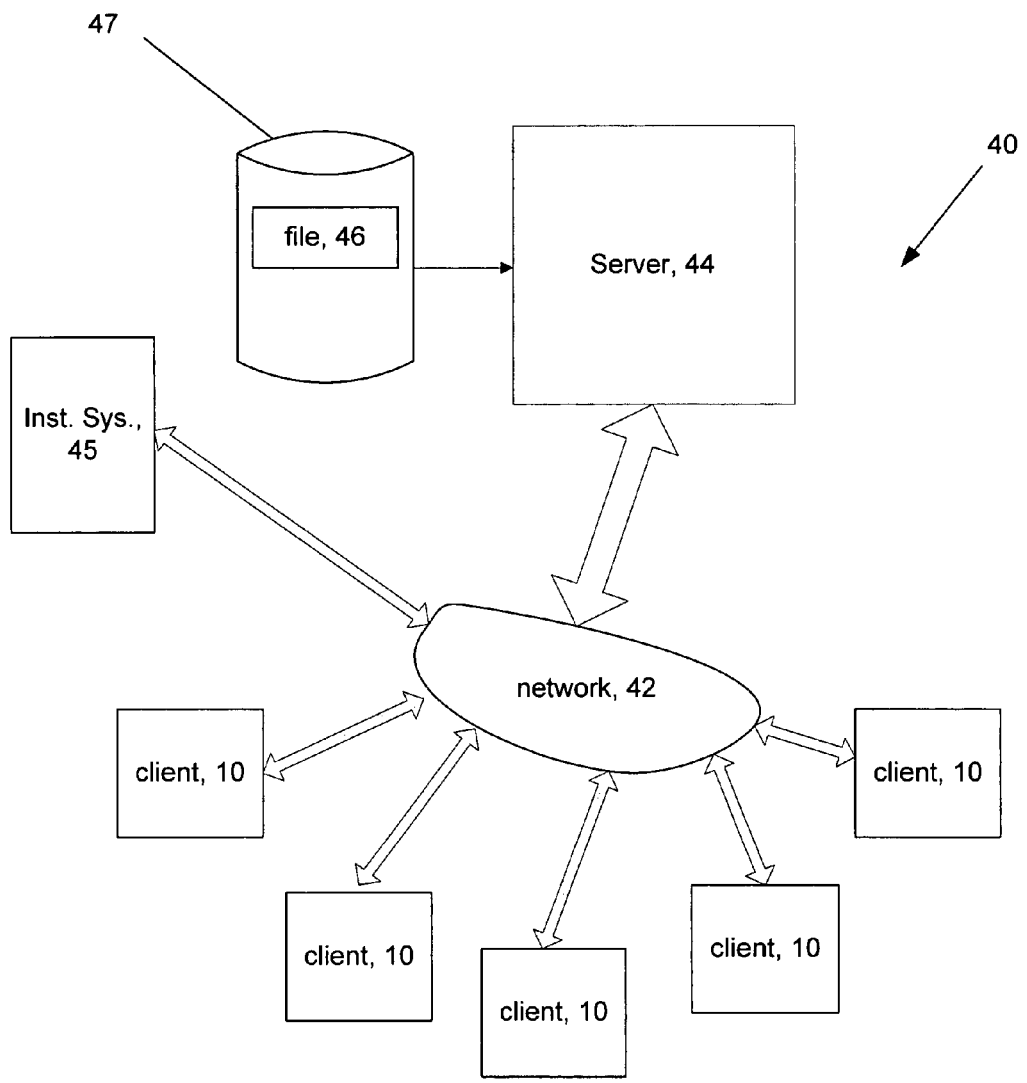
FIG. 2 is a block diagram of a network of computer systems.

Referring now to FIG. 2, a network arrangement 40 of such systems 10 is shown. This configuration is especially useful in a classroom environment where a teacher, for example, can monitor the progress of multiple students. The arrangement 40 includes multiple ones of the systems 10 or equivalents thereof coupled via a local area network, the Internet, a wide-area network, or an Intranet 42 to a server computer 44. An instructor system 45 similar in construction to the system 10 is coupled to the server 44 to enable an instructor and so forth access to the server 44. The instructor system 45 enables an instructor to import student rosters, set up student accounts, adjust system parameters as necessary for each student, track and review student performance, and optionally, to define awards.

The server computer 44 would include amongst other things a file 46 stored, e.g., on storage device 47, which holds aggregated data generated by the computer systems 10 through use by students executing software 34. The files 46 can include text-based results from execution of the tutoring software 34 as will be described below. Also residing on the storage device 47 can be individual speech files resulting from execution of the tutor software 34 on the systems 10. In other embodiments, the speech files being rather large in size would reside on the individual systems 10. Thus, in a classroom setting, an instructor can access the text-based files over the server via system 45, and can individually visit a student system 10 to play back audio from the speech files if necessary. Alternatively, in some embodiments the speech files can be selectively uploaded to the server 44.

Like many complex skills, reading depends on an interdependent collection of underlying knowledge, skills, and capabilities. The tutoring software 34 fits into development of reading skills based on existence of interdependent areas such as physical capabilities, sensory processing capabilities, and cognitive, linguistic, and reading skills and knowledge. In order for a person to learn to read written text, the eyes need to focus properly and the brain needs to properly process resulting visual information. A person learning to read should also possess basic vocabulary and language knowledge in the language of the text, such as may be acquired through oral language experience or instruction in that language, as well as phonemic awareness and a usable knowledge of phonics. In a typical classroom setting, a person should have the physical and emotional capability to sit still and "tune out" distractions and focus on a task at hand. With all of these skills, knowledge, and capabilities in place, a person can begin to learn to read with fluency and comprehension and, through such reading, to acquire the language, vocabulary, information, and ideas of texts.

The tutor software 34 described below, while useful for students of reading in general, is specifically designed for the user who has developed proper body mechanics and sensory processing and has acquired basic language, alphabet, and phonics skills. The tutor software 34 can develop fluency by supporting frequent and repeated oral reading. The reading tutor software 34 provides this frequent and repeated supported oral reading, using speech recognition technology to listen to the student read and provide help when the student struggles and by presenting records of how much and how accurately and fluently the student has read. In addition, the reading tutor software 34 can assist in vocabulary development by providing definitions of words in the built-in dictionary, by keeping track of the user's vocabulary queries, and by providing assistance that may be required to read a text that is more difficult than the user can easily read independently. The tutor software 34 can improve reading comprehension by providing a model reader to which the user can listen, and by assisting with word recognition and vocabulary difficulties. The reading tutor 34 can also improve comprehension by promoting fluency, vocabulary growth, and increased reading. As fluency, vocabulary, and reading experience increase, so does reading comprehension. which depends heavily on reading fluency. The software 34 can be used with persons of all ages including children in early though advanced stages of reading development.

Figure 3:
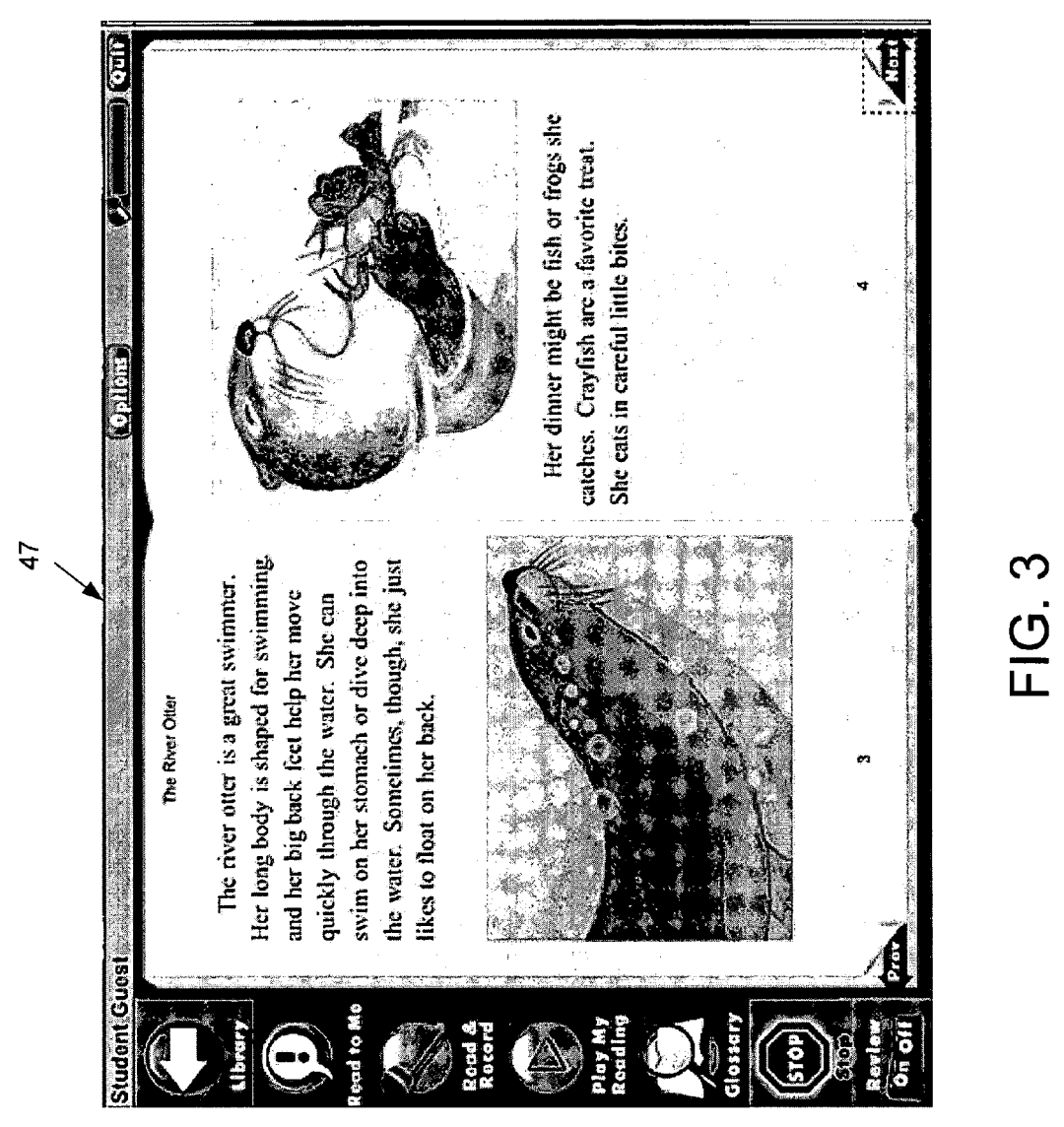

Referring now to FIG. 3, the tutor software 34 includes passages such as passage 47 that are displayed to a user on a graphical user interface. The passages can include both text and related pictures. The tutor software 34 includes data structures that represent a passage, a book, or other literary work or text. The words in the passage are linked to data structures that store correct pronunciations for the words so that utterances from the user of the words can be evaluated by the tutor software 34. The speech recognition software 32 verifies whether a user's oral reading matches the words in the section of the passage the user is currently reading to determine a user's level of fluency.

Figure 4:
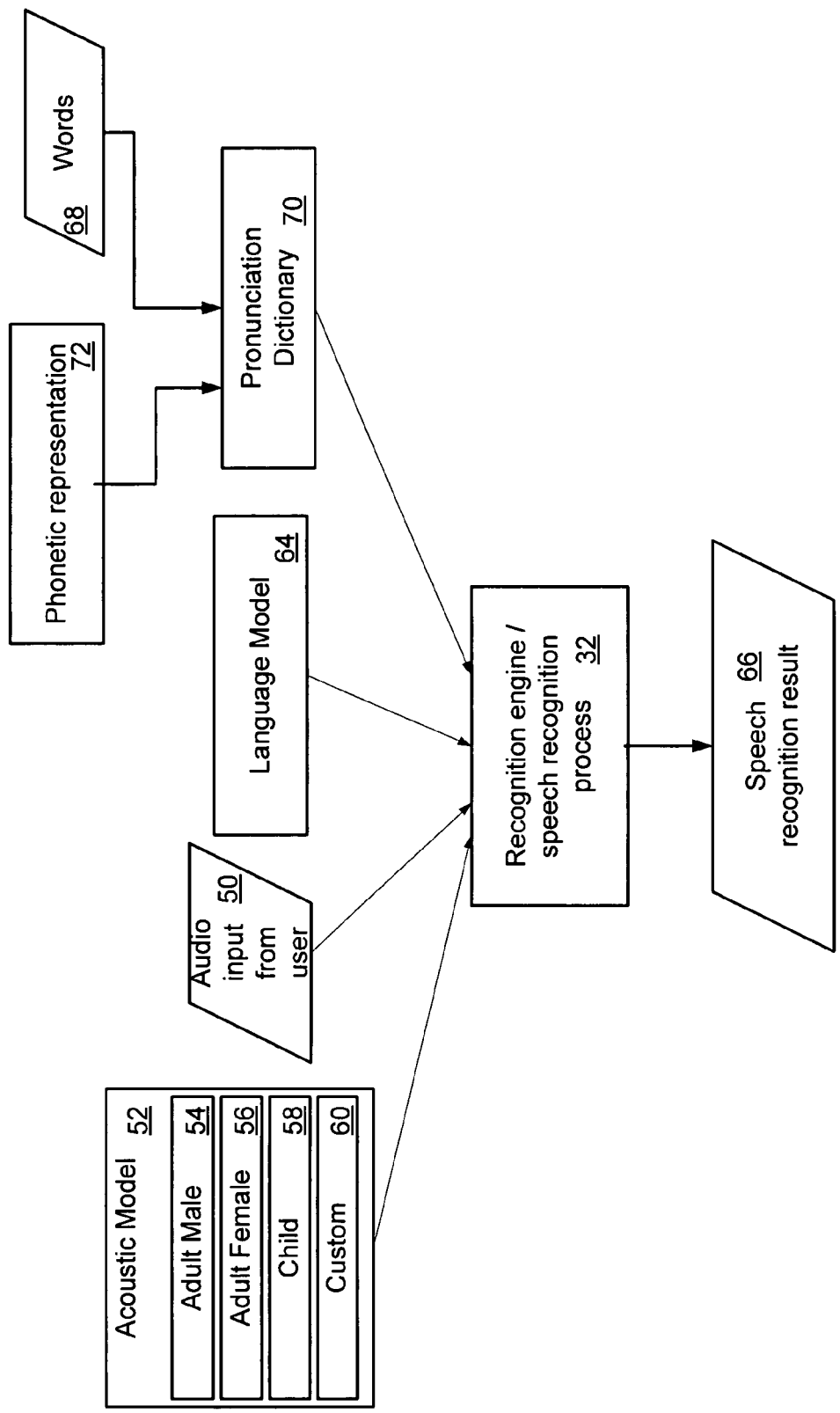
FIG. 4 is a block diagram of inputs and outputs to and from the speech recognition engine or speech recognition process.

Referring to FIG. 4, the speech recognition engine 32 in combination with the tutor software 34 analyzes speech or audio input 50 from the user, and generates a speech recognition result 66. The speech recognition engine 32 uses an acoustic model 52, a language model 64, and a pronunciation dictionary 70 to generate the speech recognition result 66.

The acoustic model 52 represents the sounds of speech (e.g., phonemes). Due to differences in speech for different groups of people or individual users, the speech recognition engine 32 includes multiple user acoustic models 52 such as an adult male acoustic model 54, an adult female acoustic model 56, a child acoustic model 58, and a custom acoustic model 60. In addition, although not shown in FIG. 4, acoustic models for various regional accents, various ethnic groups, or acoustic models representing the speech of users for which English is a second language could be included. A particular one of the acoustic models 52 is used to process audio input 50, identify acoustic content of the audio input 50, and convert the audio input 50 to sequences of phonemes 62 or sequences of words 68.

The pronunciation dictionary 70 is based on words 68 and phonetic representations. The words 68 come from the story texts or passages, and the phonetic representations 72 are generated based on human speech input or models. Both the pronunciation dictionary 70 and the language model 64 are derived from the story texts to be recognized. For the pronunciation dictionary 70, the words are taken independently from the story texts. In contrast, the language model 64 is based on sequences of words from the story texts or passages. The recognizer uses the language model 64 and the pronunciation dictionary 70 to constrain the recognition search and determine what is considered from the acoustic model when processing the audio input from the user 50. In general, the speech recognition process 32 uses the acoustic model 52, a language model 64, and a pronunciation dictionary 70 to generate the speech recognition result 66.

Figure 5:
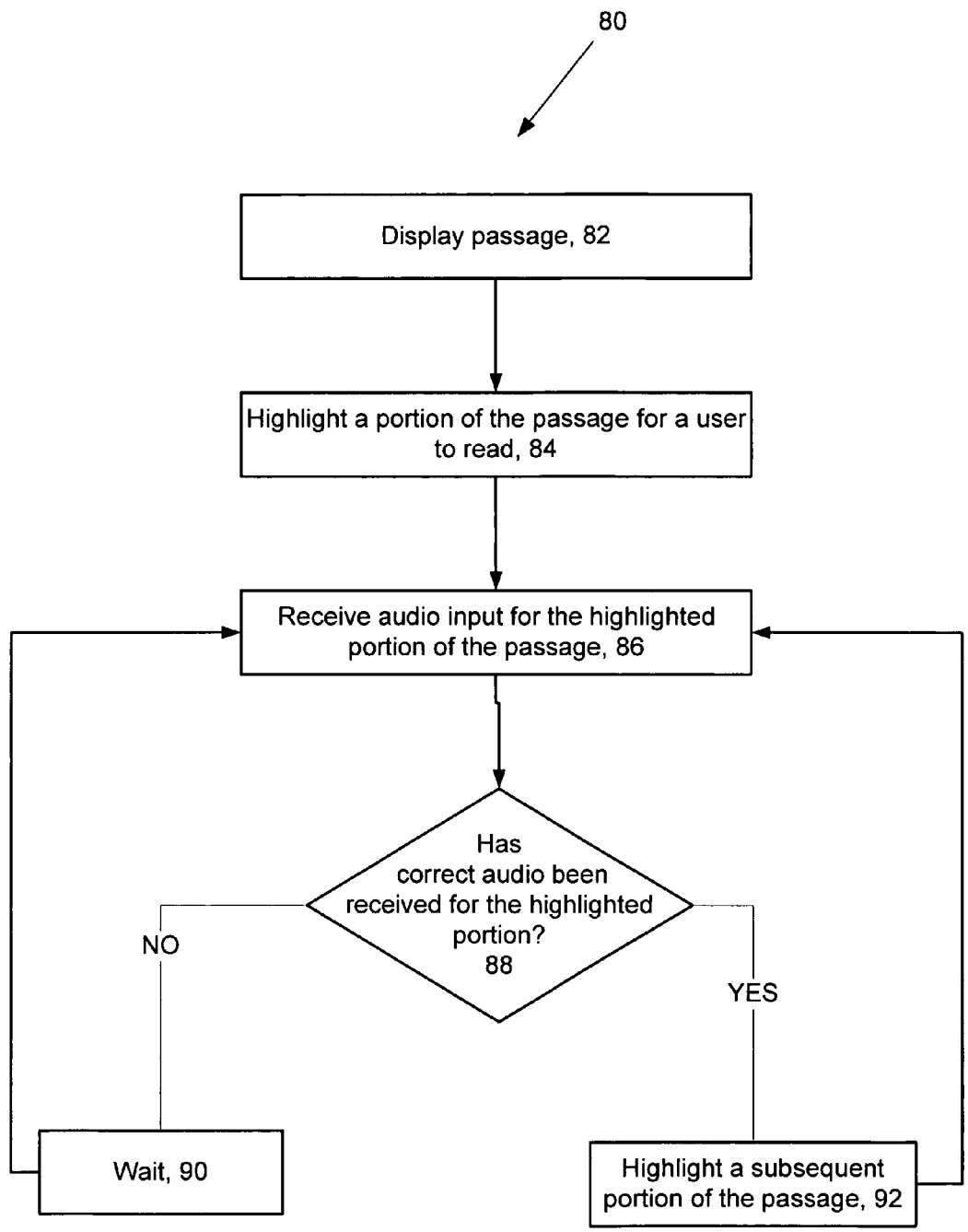
FIG. 5 is a flow chart of a location tracking process.

Referring to FIG. 5, a process 80 for tracking a user's progress through the text and providing feedback to the user about the current reading location in a passage (e.g., a passage as shown in FIG. 2) is shown. As the student reads the passage, the tutor software 34 guides the student through the passage on a sentence-by-sentence basis using sentence-by-sentence tracking. In order to provide sentence-by-sentence tracking, a passage is displayed 82 to the user. The sentence-by-sentence tracking provides 84 a visual indication (e.g., changes the color of the words, italicizes, etc.) for an entire sentence to be read by the user. The user reads the visually indicated portion and the system receives 86 the audio input. The system determines 88 if a correct reading of the indicated portion has been received. The portion remains visually indicated 90 until the speech recognition obtains an acceptable recognition from the user. After the sentence has been completed, the visual indication progresses 92 to a subsequent (e.g., the next) sentence or clause. In some embodiments, the visual indication may progress to the next sentence before the user completes the current sentence, e.g. when the user reaches a predefined point in the first sentence. Sentence-by-sentence tracking can provide advantages over word-by-word tracking (e.g., visually indicating only the current word to be read by the user, or 'turning off' the visual indication for each word as soon as it has been read correctly). Word-by-word tracking may be more appropriate in some situations, e.g., for users who are just beginning to learn to read. However, sentence-by-sentence tracking can be particularly advantageous for users who have mastered a basic level of reading and who are in need of developing reading fluency and comprehension. Sentence-by-sentence tracking promotes fluency by encouraging students to read at a natural pace without the distraction of having a visual indication change with every word. For example, if a child knows a word and can quickly read a succession of multiple words, word-by-word tracking may encourage the user to slow his or her reading because the words may not be visually indicated at the same rate as the student would naturally read the succession of words. Sentence-by-sentence feedback minimizes the distraction to the user while still providing guidance as to where s/he should be reading within the passage.

In order to provide sentence-by-sentence tracking, sentence transitions or clause transitions are indicated in the software's representation of the passage. These transitions can be used to switch the recognition context (language model) and provide visual feedback to the user. The tracking process 80 aligns the recognition result to the expected text, taking into account rules about what words the tutor software recognizes and what words can be skipped or misrecognized (as described below).

While the tutor software 34 is described as providing visual feedback based on a sentence level, other segmentations of the passage are possible and can be treated by the system as sentences. For example, the tutor software can provide the visual indication on a phrase-by-phrase basis, a clause-by-clause basis, or a line-by-line basis. The line-by-line segmentation can be particularly advantageous for poetry passages.

Phrase-by-phrase and clause-by-clause segmentation can be advantageous in helping the student to process the structure of long and complex sentences.

In some embodiments, in addition to the visual indication of the portion of the passage currently being read, a visual indication is also included to distinguish the portions previously read by the user from the portions not yet completed. For example, the previously read portions could be displayed in a different color or could be grayed. The difference in visual appearance of the previously read portions can be less distracting for the user and help the user to easily track the location on the screen.

In some embodiments, the highlighting can shift as the user progresses in addition to changing or updating the highlighting or visual indication after the recognition of the completion of the sentence. For example, when the user reaches a predetermined transition point within one sentence the visual indication may be switched off for the completed part of that sentence and some or all of the following sentence may be indicated.

As described above, the location of a student's reading within the passage is visually indicated to the user on a sentence-by-sentence basis. However, the system tracks where the user is on a word-by-word basis. The location is tracked on a word-by-word basis to allow the generation of interventions. In general, interventions are processes by which the application assists a user when the user is struggling with a particular word in a passage. It also tracks on a word-by-word basis so as to allow evaluation, monitoring and record-keeping of reading accuracy and fluency, and to generate reports to students and teachers about same.

Figure 6:
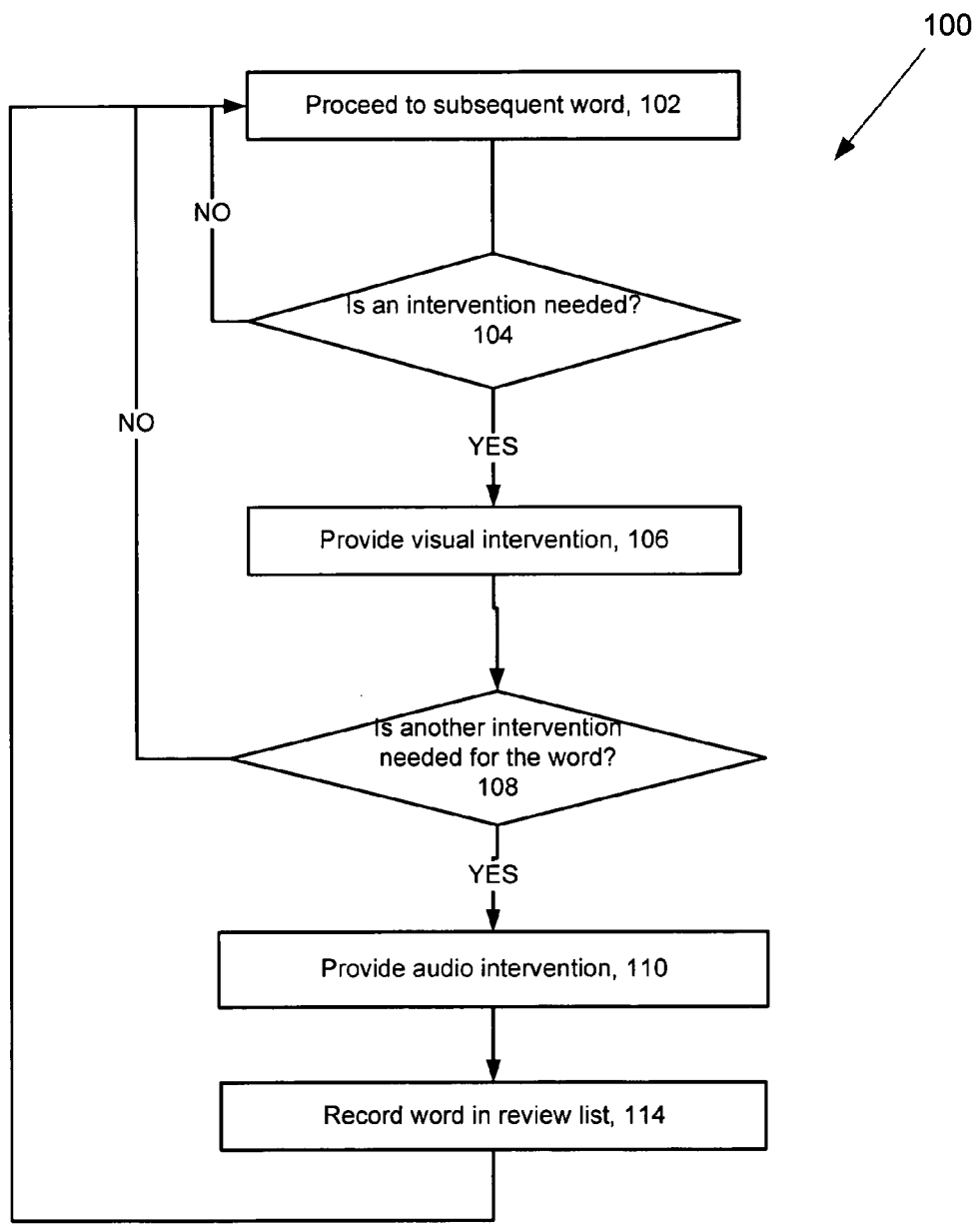
FIG. 6 is a flow chart of visual and audio interventions.

The tutor software 34 provides multiple levels of interventions, for example, the software can include a visual intervention state and audio intervention state, as shown in FIG. 6. When the tutor software 34 does not receive a valid recognition on an expected word after a specified duration has elapsed, the tutor software 34 intervenes 106 by applying a visual indication to the expected word. For example, a yellow or other highlight color may be applied over the word. Words in the current sentence that are before the expected word may also be turned from black to gray to enable the user to quickly identify where he/she should be reading. The user is given a chance to self-correct or re-read the word. The unobtrusive nature of the visual intervention serves as a warning to the student without causing a significant break in fluent reading. If the tutor software 34 still fails 108 to receive an acceptable recognition of the word, an audio intervention takes place 110. A recording or a synthesized version of the word plays with the correct pronunciation of the word and the word is placed 114 on a review list. Alternatively, a recording indicating "read from here" may be played, particularly if the word category 190 indicates that the word is a short common word that the user is likely to know. In this case, the user is likely struggling with a subsequent, more difficult word or is engaged in extraneous vocalization, so likewise the software may not place the word on a review list depending on the word category (e.g. if the word is a glue word 194). The tutor software 34 gives the student the opportunity to re-read the word correctly and continue with the current sentence. The tutor software 34 determines if a valid recognition for the word has been received and if so, proceeds 102 to a subsequent word, e.g., next word. If a valid recognition is not received, the software will proceed to the subsequent word after a specified amount of time has elapsed. As described above, the reading tutor software 34 provides visual feedback to the user on a sentence-by-sentence basis as the user is reading the text (e.g. the sentence s/he is currently reading will be black and the surrounding text will be gray). This user interface approach minimizes distraction to the user compared to providing feedback on a word-by-word basis (e.g., having words turn from black to gray as s/he is recognized). With the sentence-by-sentence feedback approach, however, it can be desirable to non-disruptively inform the user of the exact word (as opposed to sentence) where the tutor software expects the user to be reading. The software may need to resynchronize with the user due to several reasons. For example, the user may have read a word but stumbled or slurred the word and the word was not recognized, the application may have simply misrecognized a word, the user may have lost his/her place in the sentence, the user may have said something other than the word, and the like. It can be preferable to provide an intervention to help to correct such errors, but a full intervention that plays the audio for the word and marks the word as incorrect and puts the word on the review list may not be necessary. Thus, a visual intervention allows the user or the application to get back in synchronization without the interruption, distraction, and/or penalty of a full intervention on the word.

As described above, there will be a time gap from the time that a valid recognition is received for one (previous) word, during which a valid recognition for the expected (next) word has not yet been received. If there is no relevant previous word, there will be a time gap from the time the current utterance (i.e. audio file or audio buffer) was initiated, during which the expected word has not yet been received. This time gap can become significant or large for a number of reasons, e.g. a user may pause during the reading of a passage because s/he does not know the expected word, the user may mispronounce or skip the expected word, or the recognition engine may not correctly identify the expected word in the audio stream. The tutor software 34 can provide an intervention based on the length of time elapsed since the previous word, or since the start of the audio buffer or file, during which the tutor software 34 has not yet received a valid recognition for the expected word.

Figure 7A:
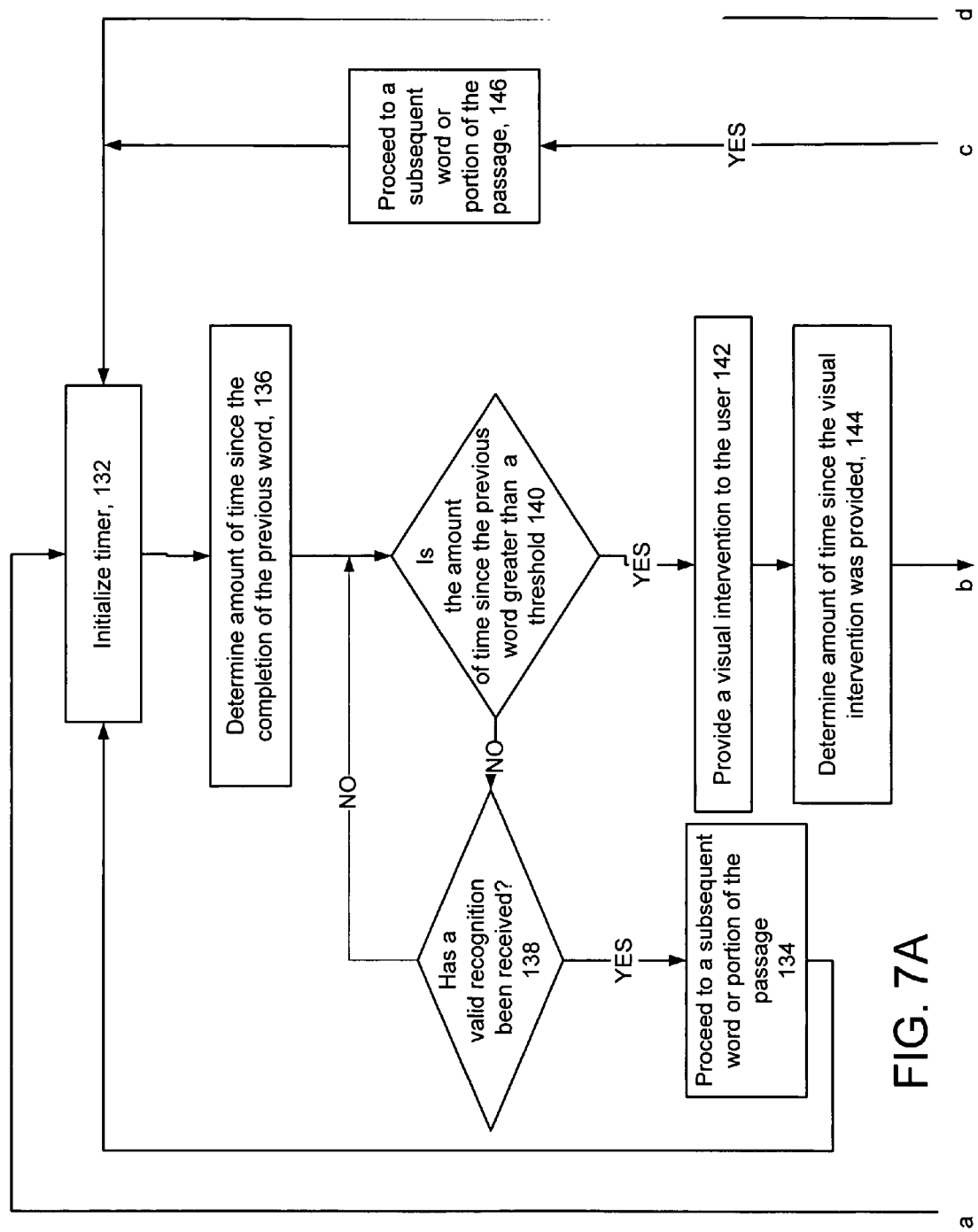
FIGS. 7A and 7B are portions of a flow chart of an intervention process based on elapsed time.
Figure 7B:
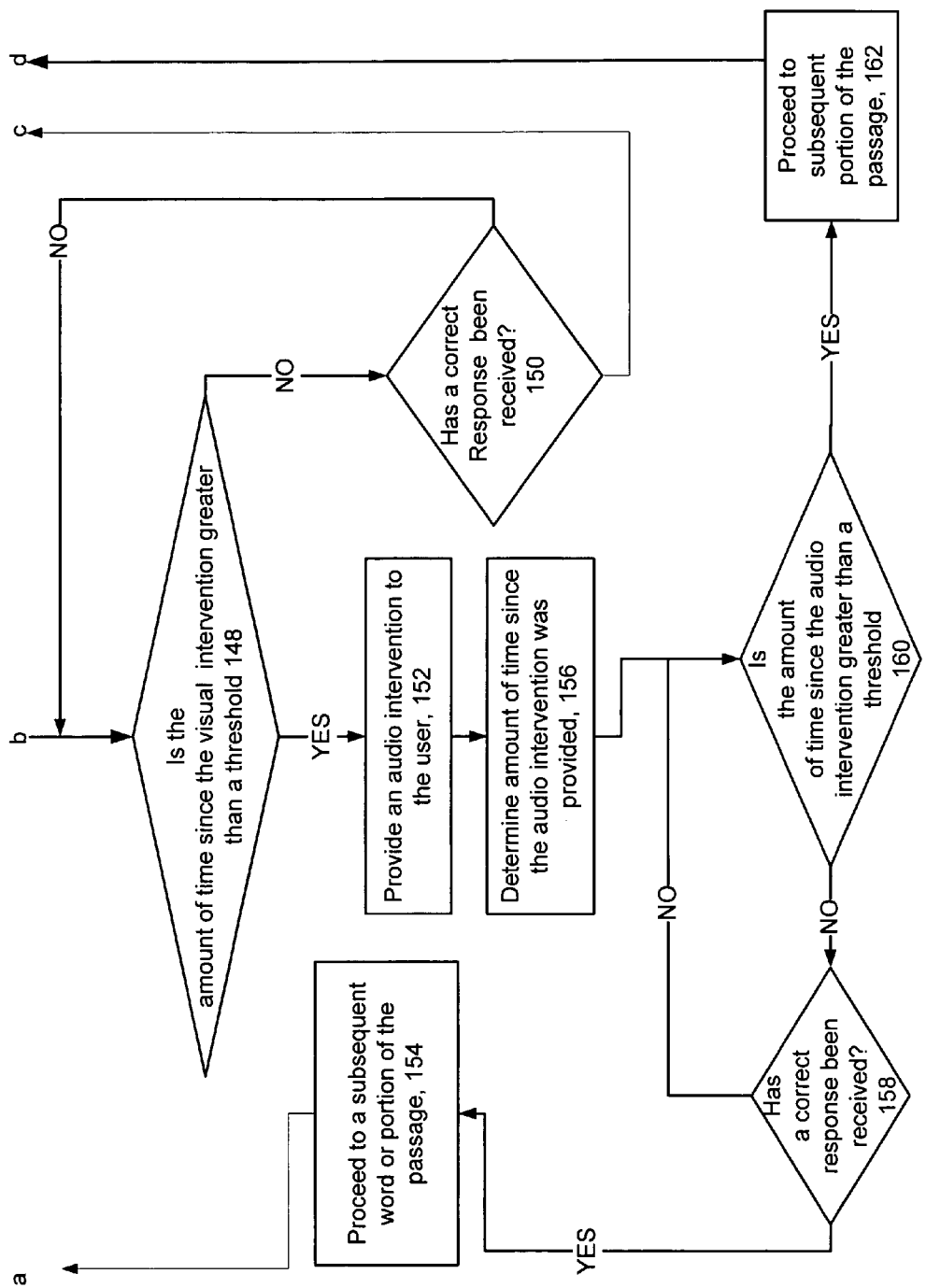

Referring to FIG. 7, a process 130 for determining an intervention based on an elapsed amount of time or a pause is shown. Process 130 includes initializing 132 a timer, e.g., a software timer or a hardware timer can be used. The timer can be initialized based on the start of a silence (no voice input) period, the start of a new audio buffer or file, the completion of a previous word, or another audio indication. The timer determines 136 a length of time elapsed since the start of the timer. Process 130 determines 140 if the amount of time on the timer since the previous word is greater than a threshold. If the time is not greater than the threshold, process 130 determines 138 if valid recognition has been received. If a valid recognition has not been received, process 130 returns to determining the amount of time that has passed. This loop is repeated until either a valid recognition is received or the time exceeds the threshold. If a valid recognition is received (in response to determination 138), process 130 proceeds 134 to a subsequent word in the passage and re-initializes 132 the timer. If the time exceeds the threshold, process 130 provides 142 a first/visual intervention. For example, the tutor software highlights the word, changes the color of the word, underlines the word, etc.

After providing the visual intervention, process 130 determines 144 an amount of time since the intervention or a total time. Similar to the portion of the process above, process 130 determines 148 if the amount of time on the timer is greater than a threshold. This threshold may be the same or different than the threshold used to determine if a visual intervention is needed. If the time is not greater than the threshold, process 130 determines 150 if a valid recognition has been received. If input has not been received, process 130 returns to determining 148 the amount of time that has passed. This loop is repeated until either a valid recognition is received or the time exceeds the threshold. If a valid recognition is received (in response to determination 148), process 130 proceeds 146 to a subsequent word in the passage and re-initializes 132 the timer. If the time exceeds the threshold, process 130 provides 152 an audio intervention.

After providing the audio intervention, process 130 determines 156 an amount of time since the intervention or a total time and determines 148 if the amount of time is greater than a threshold (e.g., a third threshold). This threshold may be the same or different from the threshold used to determine if a visual intervention or audio intervention is needed. If the time is not greater than the threshold, process 130 determines 158 if a valid recognition has been received. If input has not been received, process 130 returns to determining 160 the amount of time that has passed. This loop is repeated until either a valid recognition is received or the time exceeds the threshold. If a valid recognition is received (in response to determination 160), process 130 proceeds 154 to a subsequent word in the passage and re-initializes 132 the timer. If the time exceeds the threshold, process 130 proceeds 162 to a subsequent word in the passage, but the word is indicated as not receiving a correct response within the allowable time period.

Figure 8:
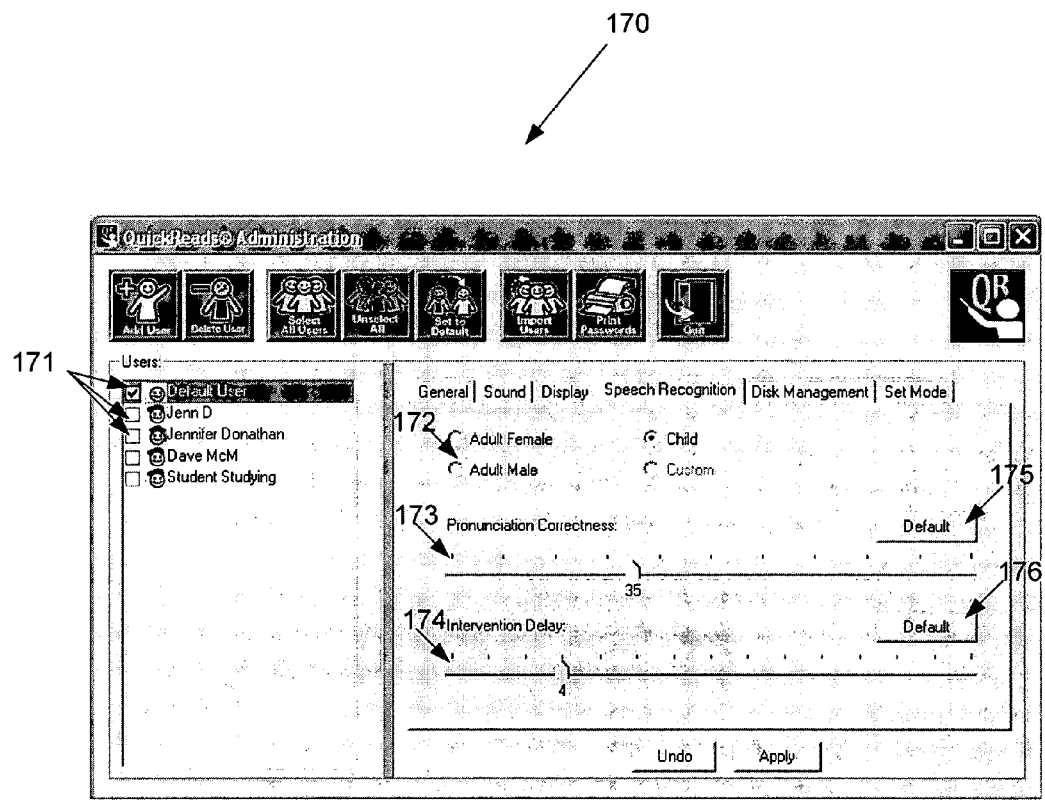
FIG. 8 is a screenshot of a set up screen for the tutor software.

In some embodiments, the visual intervention state and the full audio intervention state are used in combination. A visual intervention is triggered after a time-period has elapsed in which the tutor software 34 does not recognize a new sentence word. The "visual intervention interval" time period can be about 1-3 seconds, e.g., 2 seconds as used in the example below. However, the interval can be changed in the application's configuration settings (as shown in FIG. 8). For example, if the sentence is "The cat sat" and the tutor software 34 receives a recognition for the word "The", e.g., 0.9 seconds from the time the user starts the sentence, no intervention will be triggered for the word "The" since the time before receiving the input is less than the set time period. However, if 2.0 seconds elapses from the time the software received a recognition for "The", during which the tutor software does not receive a recognition for the word "cat" the tutor software 34 triggers a visual intervention on the word "cat"" (the first sentence word that has not been recognized). For the visual intervention, words in the current sentence which are prior to the intervened word are colored gray. The word that triggered the visual intervention (e.g. cat) is colored black and additionally has a colored (e.g., yellow) oval "highlight" overlaid over the word. The remainder of the sentence is black. Other visual representations could, however, be used.

From the point of view of speech recognition, a new recording (starting with "cat") starts with the visually intervened word and the tutor software re-synchronizes the recognition context (language model) so that the recognizer expects an utterance beginning with the intervened word.

If the user reads the word that has received visual intervention successfully before the audio intervention is triggered, the intervened word is coded, e.g., green, or correct unless the word is a member of a certain word category. For example if the word is a target word, it can be coded in a different color, and/or placed on a review list, indicating that the word warrants review even though it did not receive a full audio intervention. If the user does not read the word successfully, a full audio intervention will be triggered after a time period has elapsed. This time period is equal to the Intervention Interval (set on a slider in the application, e.g., as shown in FIG. 8) minus the visual intervention interval. The time periods before the visual intervention and between the visual intervention and the full intervention would be a minimum of about 1-5 seconds so that these events do not trigger before the user has been given a chance to say a complete word. The optimum time period settings will depend upon factors including the reading level of the text, the word category, and the reading level, age, and reading rate of the user. If the Intervention Interval is set too low (i.e. at a value which is less than the sum of the minimum time period before the visual intervention, and the minimum time period between the visual intervention and the full intervention), the visual intervention state will not be used and the first intervention will be an audio intervention.

Referring to FIG. 8, a screenshot 170 of a user interface for setting speech recognition characteristics for the tutor software 34 is shown. The speech recognition screen 170 allows a user or administrator to select a particular user (e.g., using selection boxes 171) and set speech recognition characteristics for the user. The user or administrator can select an acoustic model by choosing between acoustic models included in the system by selecting one of the acoustic model boxes 172. In addition, the user can select a level of pronunciation correctness using pronunciation correctness continuum or slider 173. The use of a pronunciation correctness slider 173 allows the level of accuracy in pronunciation to be adjusted according to the skill level of the user. In addition, the user can select an intervention delay using intervention delay slider 174. The intervention delay slider 174 allows a user to select an amount of time allowed before an intervention is generated.

As described above, speech recognition is used for tracking where the user is reading in the text. Based on the location in the text, the tutor software 34 provides a visual indication of the location within the passage where the user should be reading. In addition, the speech recognition can be used in combination with the determination of interventions to assess at what rate the user is reading and to assess if the user is having problems reading a word. In order to maximize speech recognition performance, the tutor software dynamically defines a "recognition configuration" for each utterance (i.e. audio file or buffer that is processed by the recognizer).

A new utterance will be started when the user starts a new sentence or after a visual intervention or audio intervention. The recognition configuration includes the set of items that can be recognized for that utterance, as well as the relative weighting of these items in the recognizer's search process. The search process may include a comparison of the audio to acoustic models for all items in the currently active set. The set of items that can be recognized may include expected words, for example, the words in the current sentence, words in the previous sentence, words in the subsequent sentence, or words in other sentences in the text. The set of items that can be recognized may also include word competition models. Word competition models are sequences of phonemes derived from the word pronunciation but with one or more phonemes omitted, or common mispronunciations or misreadings of words. The set of recognized sounds include phoneme fillers representing individual speech sounds, noise fillers representing filled pauses (e.g. "um") and non-speech sounds (e.g. breath noise).

For some recognition items in the active set, for example phoneme fillers, the relative weighting of these items is independent of prior context (independent of what has already been recognized in the current utterance, and of where the user started in the text). For other items, the relative weighting of items is context-dependent, i.e. dependent on what was recognized previously in the utterance and/or on where the user was in the text when the utterance started.

The context-dependent weighting of recognition items is accomplished through language models. The language models define the words and competition models that can be recognized in the current utterance, and the preferred (more highly weighted) orderings of these items, in the recognition sequence. Similar to a statistical language model that would be used in large-vocabulary speech recognition, the language model 64 defines the items (unigrams—a single word), ordered pairs of items (bigrams—a two word sequence), and ordered triplets of items (trigrams—a three word sequence) to be used by the recognition search process. It also defines the relative weights of the unigrams, bigrams, and trigrams which is used in the recognition search process. Additionally, the language model defines the weights to be applied when recognizing a sequence (bigram or trigram) that is not explicitly in the language model. However, unlike a statistical language model, the language model 64 is not based on statistics derived from large amounts of text. Instead it is based on the sequence of words in the text and on patterns of deviation from the text that are common among readers.

Figure 9:
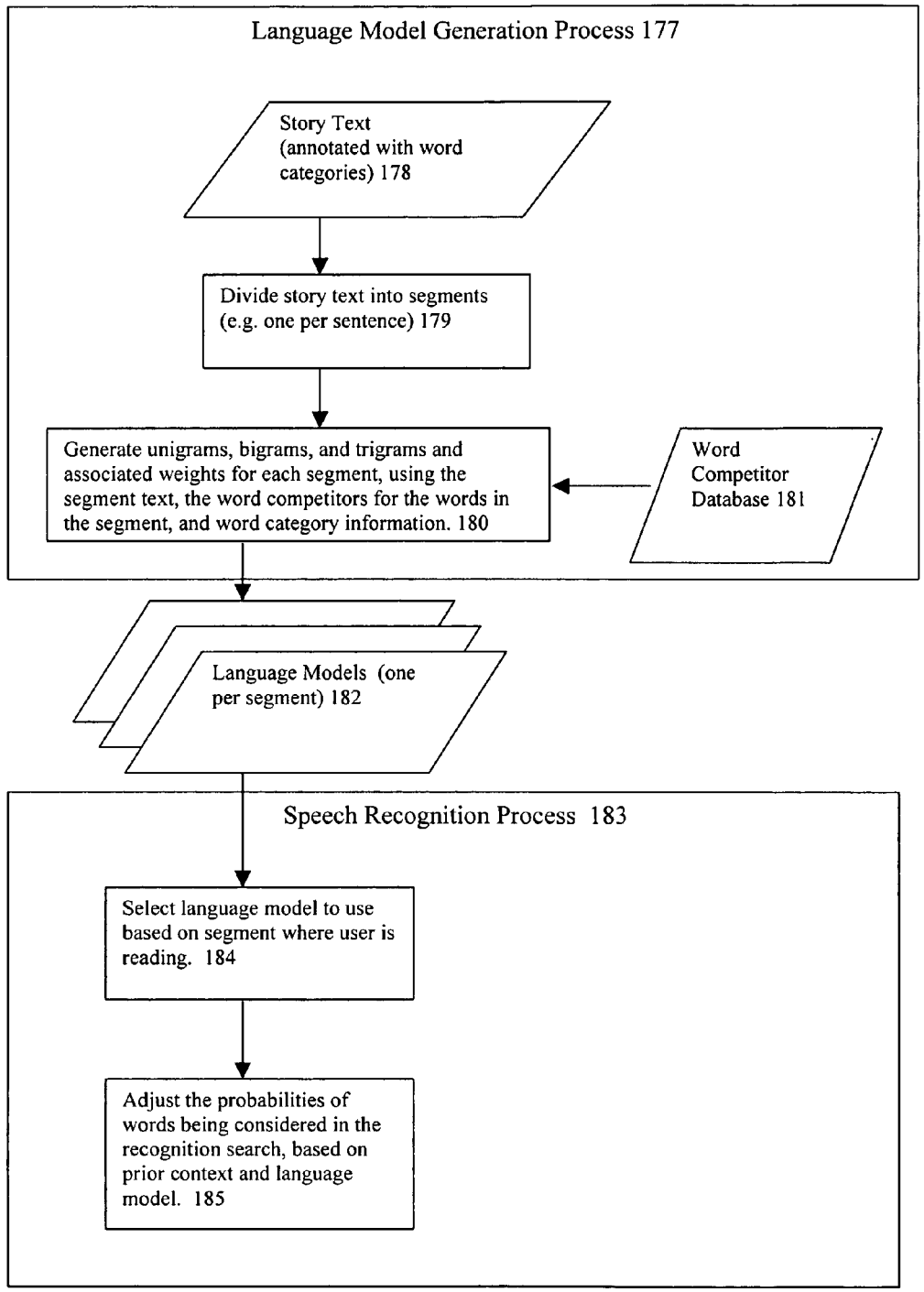
FIG. 9 is a flow chart of environmental weighting for a word based on a reader's location in a passage.

Referring to FIG. 9, the language model generation process 177 takes the current text 178 that the user is reading and divides it into segments 179. In one embodiment, each segment includes the words in a single sentence and one or more words from the following sentence. In other implementations, the segment could be based on other units such as paragraph, a page of text, or a phrase. The unigram, bigram, and trigram word sequences and corresponding weights are defined 180 based on the sequence of words in the sentence, and the word competition models for those words. The language model generation process uses rules about which words in the sentence may be skipped or not recognized in oral reading (based on word category). The speech recognition process selects the language model to use based on where the user is reading in the text 186 (e.g., the process selects the language model for the current sentence). The recognition process adjusts the probability or score of recognition alternatives currently being considered in the recognition search based on the language model 185. Once the user starts an utterance, the "prior context" used by the language model to determine weightings comes from recognition alternatives for the utterance up until that point. For example, if the sentence is "The cat sat on the mat" and a recognition alternative for the first part of the utterance is "The cat", then the weightings provided by the language model will typically prefer a recognition for "sat" as the next word over other words in the sentence.

At the very start of the utterance however, no prior context from the recognizer is yet available. In this case, the tutor software uses the prior context based on where the user was in the text at the start of this utterance. This "initial recognition context" information is also included in the language model. Therefore, if the user just received an intervention on "sat" and is therefore starting an utterance with that word, the initial recognition context of "the cat" (the preceding text words) will mean that the weightings applied will prefer recognition for "sat" as the first word of the utterance.

There are multiple ways that the recognizer configuration is dynamically changed to adjust to both the current text that is being read, and the current user. The language model 64 is sentence-based and is switched dynamically 186 each time the user enters a new sentence. The "initial recognition context" is based on the precise point in the text where the current utterance was started. In addition, the "pronunciation correctness slider" can control many aspects of the relative weighting of recognition items, as well as the content of the language model, and this setting can be changed either by the user or by the teacher during operation. Weightings or other aspects of recognition configuration that can be controlled include the relative weighting of sequences including word competition models in the language model, the relative weighting of word sequences which are explicitly in the language model (represented in bigrams and trigrams) vs. sequences which are not, and the content of the language model. The content of the language model is chosen based on how competition models are generated, what word sequences are explicitly in the language model and how s/he are weighted relative to one another. The "pronunciation correctness slider" setting may also control the relative weighting of silence, noise, or phoneme filler sequences vs. other recognition items.

In the current implementation, the language model includes the words in the current sentence and one or more words from the subsequent sentence (up to and including the first non-glue word in the subsequent sentence). The subsequent sentence words are included to help the tutor software 34 determine when the user has transitioned from the current sentence into the next sentence, especially in cases where the reader does not pause between sentences.

Figure 10:
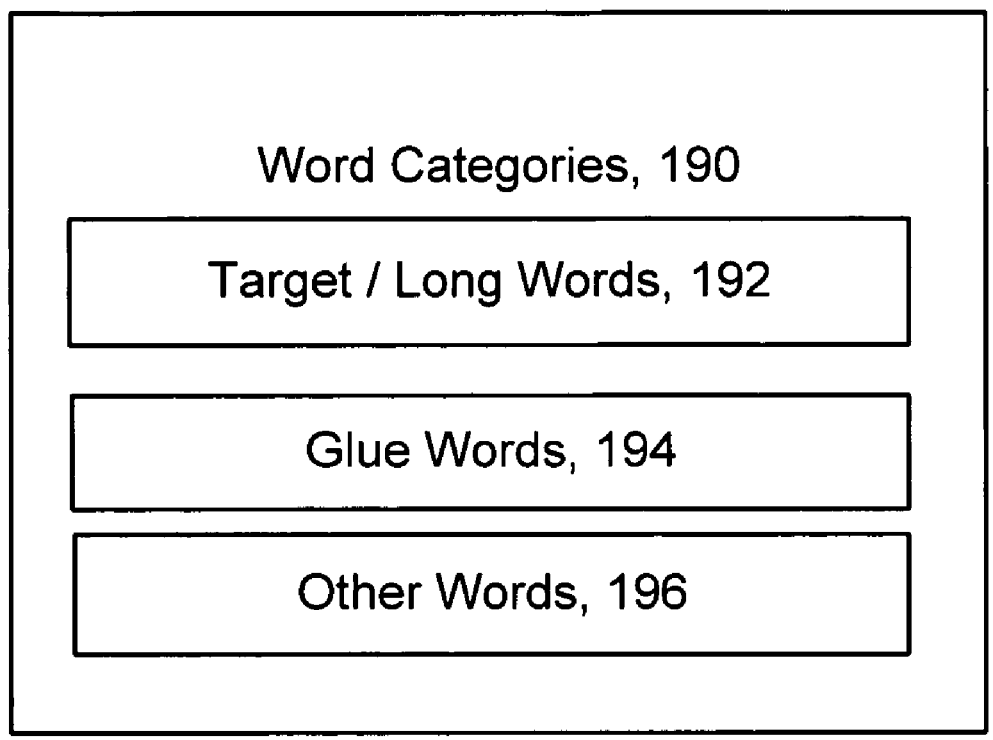
FIG. 10 is a block diagram of word categories.

Referring to FIG. 10, a set of word classifications or categories 190 is shown. The word categories can have different settings in the speech recognition and tutor software 34. The settings can be used to focus on particular words or sets of words in a passage. Word categories 190 include target words 192, glue words 194, and other words 196. Words in a passage or story are segmented into one or more of these categories or other word categories according to his or her type as described below. Based on the category, the acoustic match confidence score may be used to determine the color coding of the word and whether the word is placed on a review list. For example, if the passage is focusing on a particular set of words to expand the student's vocabulary, a higher acoustic confidence match score may be required for the words in the set.

Glue words 194 include common words that are expected to be known by the student or reader at a particular level. The glue words 194 can include prepositions, articles, pronouns, helping verbs, conjunctions, and other standard/common words. A list of common glue words 194 is shown in FIG. 11. Since the glue words 194 are expected to be very familiar to the student, the tutor software and speech recognition engine may not require a strict acoustic match confidence on the glue words 194. In some examples, the software may not require any recognition for the glue words 194. The relaxed or lenient treatment of glue words 194 allows the reader to focus on the passage and not be penalized or interrupted by an intervention if a glue word is read quickly, indistinctly, or skipped entirely.

Target words 192 also can be treated differently than other words in the passage. Target words 192 are the words that add content to the story or are the new vocabulary for a passage. Since the target words are key words in the passage, the acoustic match confidence required for the target words 192 can be greater than for non-target words. Also, the word competition models may be constructed or weighted differently for target words. In addition, the target words 192 may be further divided into multiple sub-classifications, each sub-classification requiring different treatment by the speech recognizer and the tutoring software.

Additional word categories may also be defined, such as a category consisting of words which the user has mastered based on the user's past reading history. For example, the time gap measurement may not be used to color code words or place words on the review list if the words are in the mastered word category. Instead, if the time gap measurement for the mastered word exceeds a threshold, it will be used as an indication that the user struggled with a different word in the sentence or with the overall interpretation of the sentence.

Words in a text can be assigned to a word category based on word lists. For example, words can be assigned to the glue word category if the are on a list such as the common glue word list (FIG. 11), assigned to the mastered word category if s/he are on a list of words already mastered by that user, and assigned to a target word category if s/he are in a glossary of new vocabulary for a passage. However, to be more effective, word categorization can also take into account additional factors such as the importance of a word to the meaning of a particular sentence, the lesson focus, and the reading level of the user and of the text. Therefore a word may be assigned to a particular category (e.g. the glue word category) in one sentence or instance, and the same word may assigned to a different category in another sentence or instance, even within the same text.

Figure 12A:
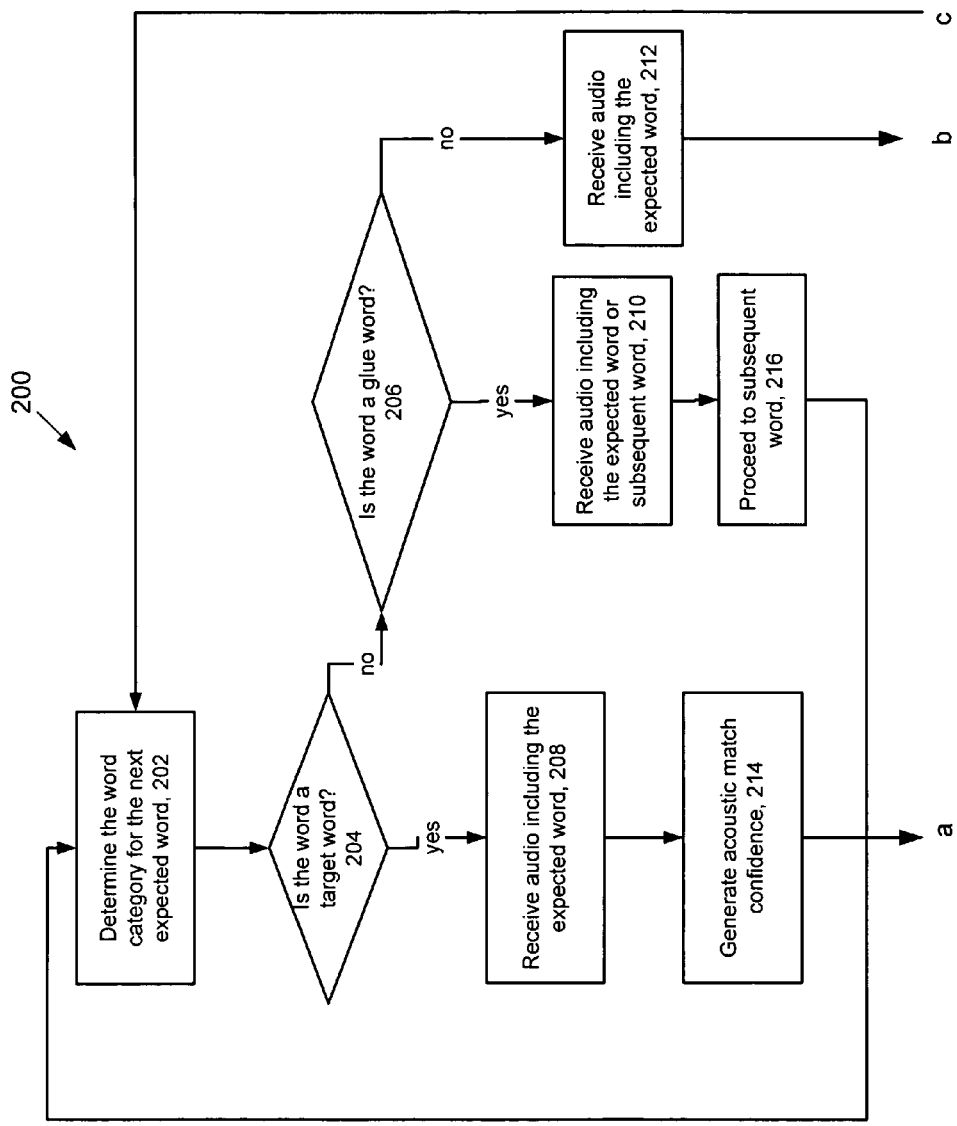
FIGS. 12A and 12B are portions of a flow chart of a process using word categories to assess fluency.
Figure 12B:
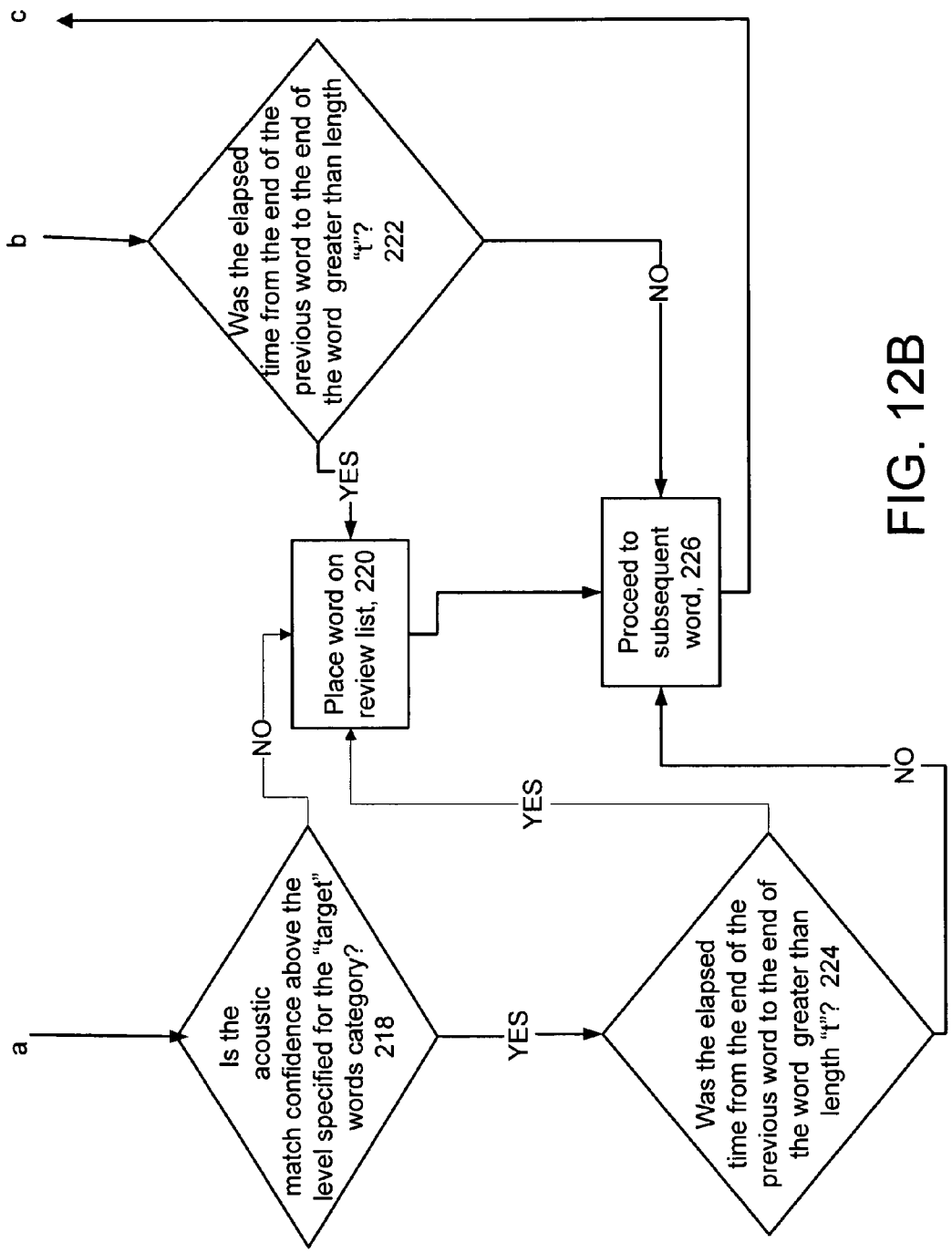

Referring to FIG. 12, a process 200 related to the progression of a reader through a story is shown. For the location of the user within the story, the speech recognition software determines 202 the word category for the next or subsequent word in the passage. The speech recognition software determines 204 if the word is a target word.

The speech recognition software 32 receives 208 audio from the user and generates a recognition sequence corresponding to the audio. If a valid recognition for an expected word is not received, the software will follow the intervention processes outlined above, unless the word is a glue word. If the word is a glue word, a valid recognition may not be required for the word. In this example, the speech recognition software receives 210 audio input including the expected glue word or a subsequent word and proceeds 216 to a subsequent word.

If a valid recognition for the expected word is received, and the word is not a glue word, the tutor software analyzes additional information obtained from the speech recognition sequence. The software measures 222 and 224 if there was a time gap exceeding a predetermined length prior to or surrounding the expected word. If there is such a time gap, the word is placed 220 on a review list and coded a color to indicate that it was not read fluently. Typically this color is a different color from that used for 'correct' words (e.g. green), and also different from the color used to code words that have received an audio intervention (e.g. red). In addition, if the word is a target word, the software analyzes the acoustic match confidence 214 that has been generated for the word. The acoustic match confidence is used to determine if the audio received from the user matches the expected input (as represented by the acoustic model for that word) closely enough to be considered as a correct pronunciation. The speech recognition software determines 218 if the acoustic match confidence for the particular target word is above a predefined level. If the match confidence is not above the level, the word is placed on a review list 220 and coded a color to indicate that it was not read correctly or fluently. After determining the coding of the word, the tutor software 34 proceeds 226 to the subsequent word.

While in the above example, only target words were evaluated using acoustic match confidence, other words in the glue word category or other word category could also be evaluated using acoustic match confidence. The implementation of word categories may include additional different treatment of words and may include more or fewer word categories 190. In addition, the treatment of different categories of words can be controlled dynamically at the time the software is run. As described above, the tutor software 34 generates a list of review words based on the student's reading of the passage. A word may also be placed on the review list for reasons not directly related to the student's reading of the passage, for example if the student requested a definition of the word from the tutor software, the word could be placed on the review list. The review list can include one or more classifications of words on the review list and words can be placed onto the review list for multiple reasons. The review list can be beneficial to the student or to an administrator or teacher for providing feedback related to the level of fluency and specific difficulties for a particular passage. The review list can be used in addition to other fluency assessment indications such as number of total interventions per passage or words per minute. In some embodiments, the list of review words can be color-coded (or distinguished using another visual indication such as a table) based on the reason the word was included in the review list. For example, words can be included in the review list if an acoustic match confidence for the word was below a set value or if the user struggled to say the word (e.g., there was a long pause prior to the word). Words can also be placed on the review list if the user received a full audio intervention for the word (e.g., if the tutor software did not receive a valid recognition for the word in a set time, or the user requested an audio intervention for that word). Words that have been included on the review list due an audio intervention can be color coded in a one color while words placed on the review list based on the analysis of a valid recognition for the word (either time gaps associated with the word, or acoustic match confidence measurements) can be color coded in a second color.

Figure 13:
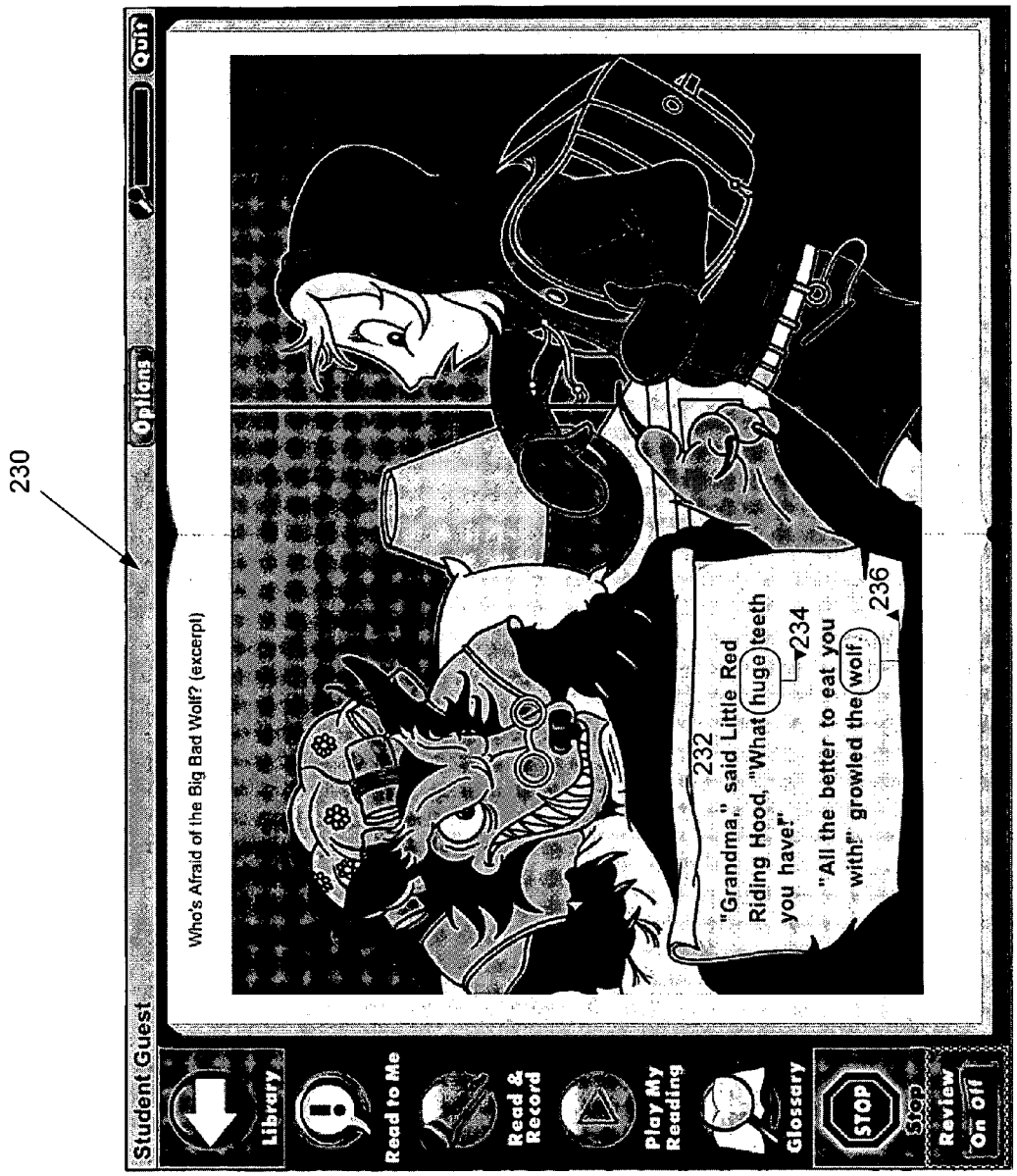
FIG. 13 is a screenshot of a passage.

Referring to FIG. 13, in addition to color coding words on a review list, the words can also be color coded directly in the passage as the student is reading the passage. For example, in passage 323 shown on screenshot 230 the word 234 'huge' is coded in a different manner than the word 236 'wolf.' The first color-coding on word 234 is related to a pause exhibited in the audio input between the word 'what' and the word 'huge'. The second color-coding on word 236 is related to the user receiving an audio intervention for the word 236. Both words 234 and 236 would also be included on a list of review words for the user.

While the language models and sentence tracking have been described above based on a sentence, other division points within a passage could be used. For example, the language models and sentence-by-sentence tracking could be applied to sentence fragments as well as to complete sentences. For example, s/he could use phrases or lines as the "sentence." For example, line-by-line type sentence-by-sentence tracking can be useful to promote fluency in poetry reading. In addition, tracking sentences by clauses or phrases can allow long sentences to be divided and understood in more manageable linguistic units by the user. In some embodiments, single words may be used as the unit of tracking. Furthermore, the unit of tracking and visual feedback need not be the same as the unit of text used for creating the language models. For example, the language models could be based on a complete sentence whereas the tracking could be phrase-by-phrase or word-by-word.

A number of embodiments of the invention have been described. Nevertheless, it will be understood that various modifications may be made without departing from the spirit and scope of the invention. For example, the system can provide support to people who are learning to read a second language. The system can support people who are learning to read in a language other than English, whether as a first or second language. The system can have a built-in dictionary that will explain a word's meaning as it is used in the text. The built-in dictionary can provide information about a word's meaning and usage in more than one language including, for example, the language of the text and the primary language of the user. Accordingly, other embodiments are within the scope of the following claims.

What is claimed is:

1. A computer based method comprising:
   receiving audio input associated with a user reading a sequence of words, the sequence of words displayed on a graphical user interface, and including an assessed word and optionally a word preceding the assessed word;
   determining an approximate amount of time corresponding to an absence of input associated with the assessed word, since receiving audio input identified as the preceding word in the sequence of words, or since the start of the audio file or buffer associated with the sequence of words if there is no preceding word;
   displaying a visual intervention on the graphical user interface if the amount of time is greater than a first threshold; and
   subsequent to displaying a visual intervention, generating an audio intervention if the amount of time since the visual intervention is greater than a second threshold, and audio input associated with the assessed word has still not been received.

2. The method of claim 1 wherein the visual intervention includes applying a visual indicium to the assessed word.

3. The method of claim 1 wherein the visual indicium includes a visual indicium selected from the group consisting of highlighting the assessed word, underlining the assessed word, or coloring the text of the assessed word.

4. The method of claim 1 further comprising:
   determining an approximate amount of time between the audio segment identified as the preceding word in the sequence of words and the audio segment identified as the assessed word in the sequence of words; and
   presenting an indicium if the amount of time between the audio segment identified as the preceding word in the sequence of words and the audio segment identified as the assessed word is greater than a third threshold.

5. The method of claim 4 wherein the presenting of the indicium is deferred until after the user has finished the text or has indicated to the tutoring software that he/she has stopped reading.

6. The method of claim 5 wherein presenting a deferred indicium includes placing the assessed word on a review list.

7. The method of claim 5 wherein presenting a deferred indicium includes coloring the text of the assessed word.

8. The method of claim 1 wherein generating an audio intervention includes generating an audio intervention selected from the group consisting of an audio file including a pronunciation of the assessed word and an audio file including an indication for the user to re-read starting with the assessed word.

9. The method of claim 1 further comprising generating a first report including words for which a visual intervention or deferred visual indicium was displayed.

10. The method of claim 1 further comprising generating a second report including words for which an audio intervention was generated.

11. The method of claim 1 wherein the first threshold is between about 1 and 3 seconds.

12. The method of claim 1 wherein the second threshold is between about 1 and 8 seconds.

13. The method of claim 4 wherein the third threshold is between about 0.5 and 5 seconds.

14. The method of claim 4 wherein determining an approximate amount of time between the audio segment associated with a preceding word, and the audio segment associated with an assessed word, includes measuring an amount of time from the end of the preceding word to the beginning of the assessed word.

15. The method of claim 4 wherein determining an approximate amount of time between the audio segment identified as a preceding word, and the audio segment identified as an assessed word, includes measuring an amount of time from the end of the first word to the end of the second word.

16. The method of claim 4 further comprising adjusting the timing thresholds based on a timing gap between the end of the assessed word and the beginning of the word following the assessed word.

17. The method of claim 1 further comprising adjusting the timing thresholds based on the position of the word in the sentence.

18. The method of claim 1 further comprising adjusting the timing thresholds based on the proximity of the word to punctuation or a phrase boundary.

19. The method of claim 1 wherein the timing thresholds are different for different word categories.

20. The method of claim 1 wherein the timing thresholds are different for different texts or text reading levels.

21. The method of claim 1 wherein the timing thresholds are different for different users, user ages, user reading levels, or the base or "trouble-free" reading rate of the user.

22. A computer program product residing on a computer readable medium comprising instructions for causing an electrical device to:
   receive audio input associated with a user reading a sequence of words, the sequence of words displayed on a graphical user interface, and including an assessed word and optionally a word preceding the assessed word;
   determine an approximate amount of time corresponding to an absence of input associated with the assessed word, since receiving audio input identified as the preceding word in the sequence of words, or since the start of the audio file or buffer associated with the sequence of words if there is no preceding word;
   display a visual intervention on the graphical user interface if the amount of time is greater than a first threshold; and
   subsequent to displaying a visual intervention, generate an audio intervention if the amount of time since the visual intervention is greater than a second threshold, and audio input associated with the assessed word has still not been received.

23. The computer program product of claim 22 wherein the visual indicium includes a visual indicium selected from the group consisting of highlighting the assessed word, underlining the assessed word, or coloring the text of the assessed word.

24. The computer program product of claim 22 further comprising instructions for causing an electrical device to:
   determine an approximate amount of time between the audio segment identified as the preceding word in the sequence of words and the audio segment identified as the assessed word in the sequence of words; and
   present an indicium if the amount of time between the audio segment identified as the preceding word in the sequence of words and the audio segment identified as the assessed word is greater than a third threshold.

25. The computer program product of claim 22 further comprising instructions for causing an electrical device to generate a first report including words for which a visual intervention or deferred visual indicium was displayed.

26. The computer program product of claim 25 further comprising instructions for causing an electrical device to generate a second report including words for which an audio intervention was generated.

27. A device configured to:
- receive audio input associated with a user reading a sequence of words, the sequence of words displayed on a graphical user interface, and including an assessed word and optionally a word preceding the assessed word;
- determine an approximate amount of time corresponding to an absence of input associated with the assessed word, since receiving audio input identified as the preceding word in the sequence of words, or since the start of the audio file or buffer associated with the sequence of words if there is no preceding word;
- display a visual intervention on the graphical user interface if the amount of time is greater than a first threshold; and
- subsequent to displaying a visual intervention, generate an audio intervention if the amount of time since the visual intervention is greater than a second threshold, and audio input associated with the assessed word has still not been received.

28. The device of claim 27 wherein the visual indicium includes a visual indicium selected from the group consisting of highlighting the assessed word, underlining the assessed word, or coloring the text of the assessed word.

29. The device of claim 27 further configured to:
- determine an approximate amount of time between the audio segment identified as the preceding word in the sequence of words and the audio segment identified as the assessed word in the sequence of words; and
- present an indicium if the amount of time between the audio segment identified as the preceding word in the sequence of words and the audio segment identified as the assessed word is greater than a third threshold.

30. The device of claim 27 further configured to generate a first report including words for which a visual intervention or deferred visual indicium was displayed.

31. The device of claim 27 further configured to generate a second report including words for which an audio intervention was generated.

* * * * *